US012619181B2

(12) United States Patent
Kawashima et al.

(10) Patent No.: US 12,619,181 B2
(45) Date of Patent: May 5, 2026

(54) FIXING DEVICE

(71) Applicant: CANON KABUSHIKI KAISHA, Tokyo (JP)

(72) Inventors: Misa Kawashima, Chiba (JP); Ikuo Nakamoto, Chiba (JP); Hiroki Kawai, Chiba (JP); Shohei Tsuzaki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/026,064

(22) Filed: Jan. 16, 2025

(65) Prior Publication Data

US 2025/0278044 A1 Sep. 4, 2025

(30) Foreign Application Priority Data

Feb. 29, 2024 (JP) ................................ 2024-030720

(51) Int. Cl.
*G03G 15/20* (2006.01)

(52) U.S. Cl.
CPC ....... *G03G 15/206* (2013.01); *G03G 15/2053* (2013.01); *G03G 15/2064* (2013.01); *G03G 2215/2025* (2013.01)

(58) Field of Classification Search
CPC ........... G03G 15/2053; G03G 15/2064; G03G 2215/2035; G03G 2215/2038; G03G 15/2025
See application file for complete search history.

(56) References Cited

U.S. PATENT DOCUMENTS

| | | | | |
|---|---|---|---|---|
| 10,901,353 | B2 * | 1/2021 | Tanaka | B65G 15/30 |
| 11,156,948 | B2 | 10/2021 | Tanaka et al. | |
| 2019/0235422 | A1 * | 8/2019 | Yabuki | G03G 15/2053 |
| 2019/0235428 | A1 * | 8/2019 | Yabuki | G03G 15/2064 |
| 2020/0103798 | A1 | 4/2020 | Tanaka et al. | G04G 15/2053 |
| 2020/0233353 | A1 * | 7/2020 | Tsuno | G03G 15/2053 |

FOREIGN PATENT DOCUMENTS

JP 2020-052354 4/2020

* cited by examiner

*Primary Examiner* — Jessica L Eley
(74) *Attorney, Agent, or Firm* — Venable LLP

(57) ABSTRACT

A fixing device includes a contact member contacting a belt in a nip. The contact member includes projections distributing on and outside the nip in a widthwise direction. When first region is outside the nip and second region is inside the first region, first ridge line is a line of an end portion, of a leading side of the projection, of which a length is longer in a conveyance direction and the length is LA, second ridge line is a line of the end portion of the outer side, of the leading side of the projection positioned on the outmost in the first region and the length is LB, average lengths of LA and LB of the projections along the conveyance direction are $LA_{ave}$ and $LB_{ave}$, $LB_{ave}>LA_{ave}$ is satisfied.

16 Claims, 16 Drawing Sheets

(a)

(b)

(a)

(b)

FIXING DEVICE

FIELD OF THE INVENTION AND RELATED ART

The present invention relates to a fixing device which fixes a toner image carried on a recording material to the recording material.

As a fixing device, a configuration is conventionally known in which a nip portion for nipping and conveying is formed by a belt and a nip portion forming member such as a roller and the recording material passing through the nip portion is heated and pressed. In addition, in this configuration, by a sliding member being slid with an inner peripheral surface of the belt in the nip portion, the nip portion is formed between the belt and the nip portion forming member.

In order to guarantee quality of an image to be fixed to the recording material, in the fixing device, it is required to suppress slippage between the recording material, which is conveyed by the nip portion, and the belt and between the recording material and the nip portion forming member. For this reason, it is required that frictional force between the belt and the sliding member is made to be less than these frictional force between the recording material and the belt and between the recording material and the nip portion forming member. In particular, in a configuration which includes a wide nip, in which a width of the nip portion is widened to increase heating efficiency, it is required that the frictional force between the belt and the sliding member is made to be less.

For example, in Japanese Patent Application Laid-Open No. 2020-052354, a configuration, in which irregularities are formed on a sliding sheet, which slides with an inner peripheral surface of a belt in a nip portion to reduce frictional force between the sliding sheet and the belt, is disclosed.

SUMMARY OF THE INVENTION

According to an aspect of the present invention, there is provided a fixing device for fixing a toner image carried on a recording material to the recording material, the fixing device comprising: an endless and rotatable belt; a rotatable pressing member configured to contact an outer peripheral surface of the belt and form a nip portion for nipping and conveying the recording material between itself and the belt; and a contact member configured to contact an inner peripheral surface of the belt in the nip portion, wherein the inner peripheral surface of the belt slides with the contact member, wherein the contact member includes a plurality of projections provided on a side where the contact member slides with the belt and so as to project toward the inner peripheral surface of the belt, the plurality of the projections distributing on the nip portion and outside the nip portion with respect to a widthwise direction of the recording material crossing a conveyance direction of the recording material, and wherein when in a region where the plurality of the projections of the contact member exist, a predetermined region outside the nip portion in the widthwise direction crossing the conveyance direction of the recording material is defined as a first region, and a region inside the first region in the widthwise direction and inside the nip portion is defined as a second region, of both end portions, in the widthwise direction, of a leading side surface of the projections in the second region, a line of the end portion of which a length is longer in the conveyance direction is defined as a first ridge line and the length of the first ridge line is defined as LA, a line of the end portion outside, in the widthwise direction, the leading side surface of the projection which is positioned on the outmost side with respect to the widthwise direction in the first region is defined as a second ridge line and the length of the second ridge line is defined as LB, of the plurality of the projections in the second region, an average length of the LA of the plurality of the projections in a line along the conveyance direction is defined as $LA_{ave}$, and of the plurality of the projections in the first region, an average length of the LB of the plurality of the projections in a line along the conveyance direction is defined as $LB_{ave}$, the following relationship is satisfied: $LB_{ave}>LA_{ave}$.

Further features of the present invention will become apparent from the following description of exemplary embodiments with reference to the attached drawings.

Figure 1:
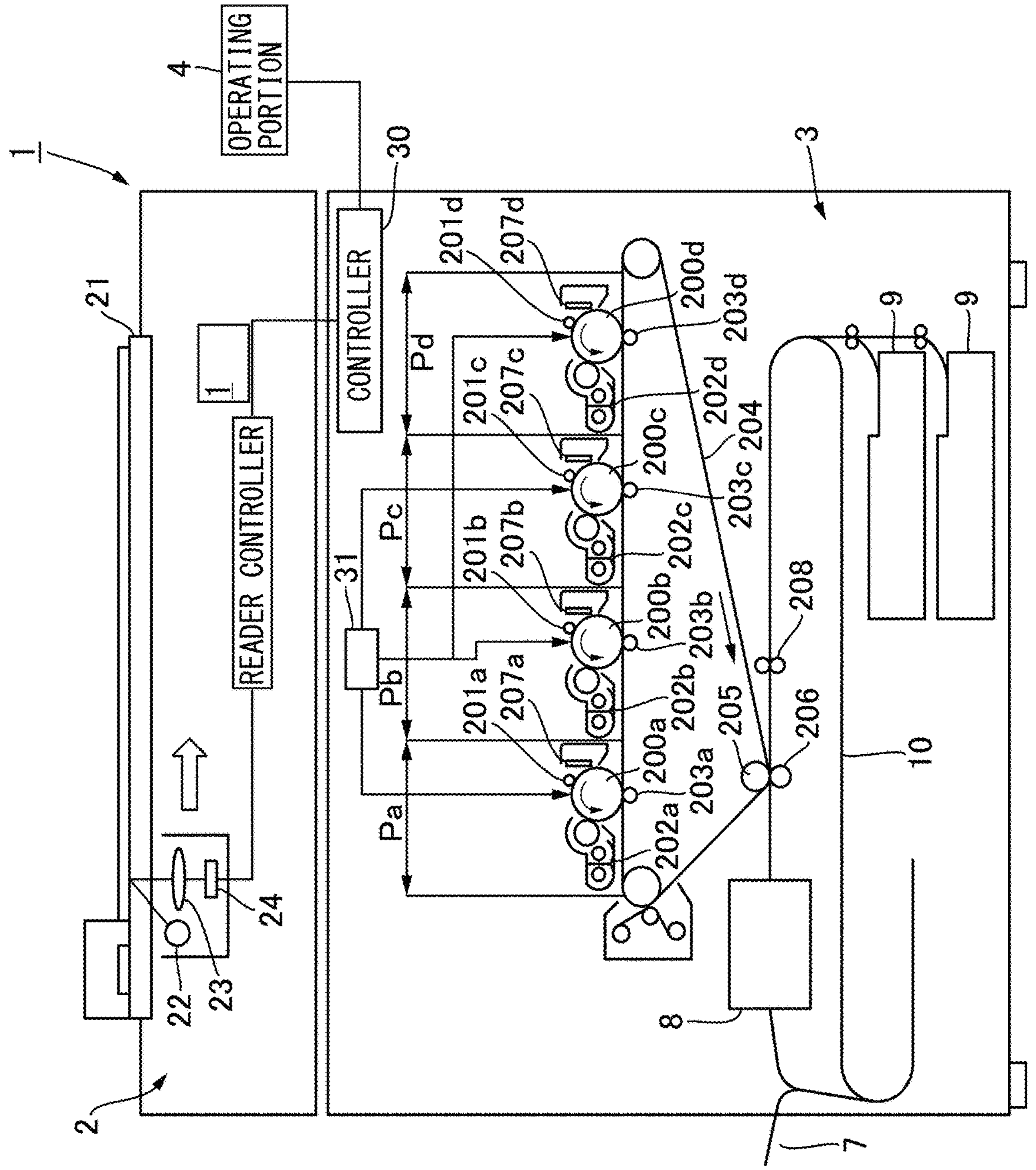
FIG. 1 is a cross-sectional view of an outline configuration of an image forming apparatus according to an Embodiment 1.
Figure 2:
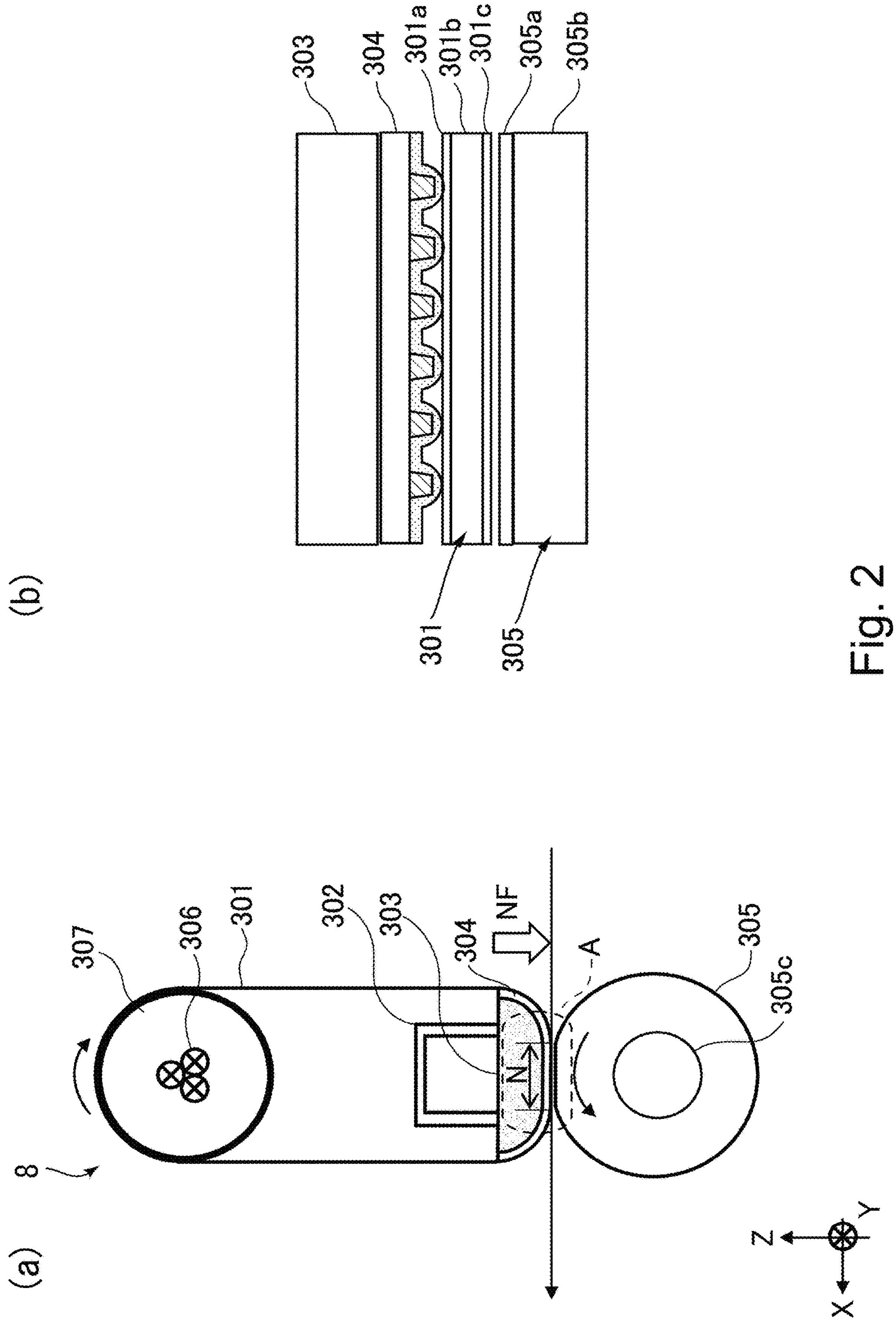

Part (a) of FIG. 2 is a cross-sectional view of an outline configuration of a fixing device according to the Embodiment 1, and part (b) of FIG. 2 is a schematic view illustrating an enlarged portion A in part (a).

Figure 3:
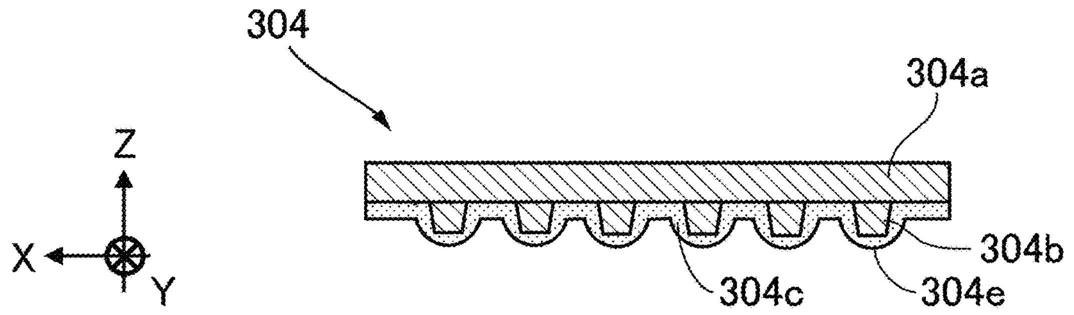
Figure 3:
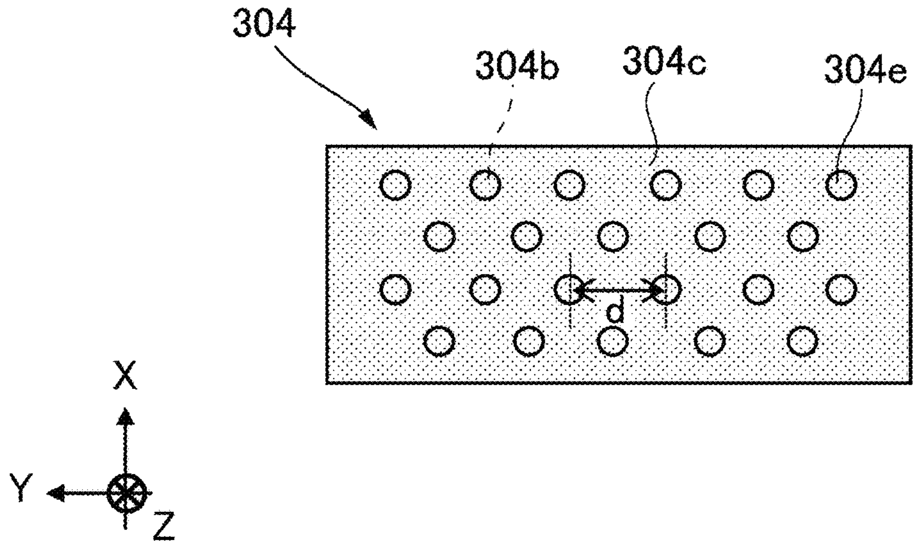

FIG. 3 includes a cross-sectional view in part (a) and a plan view in part (b), which schematically illustrate a sliding member according to the Embodiment 1.

Figure 4:
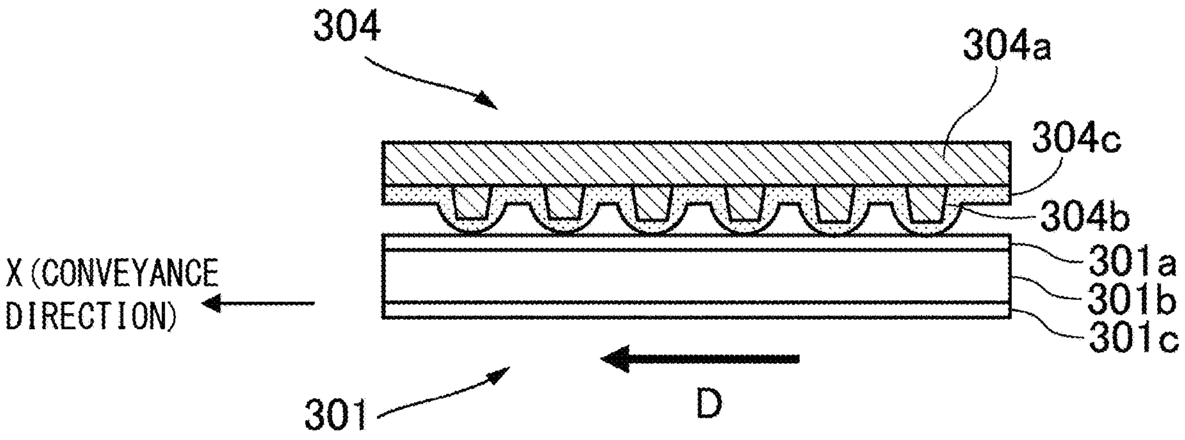

FIG. 4 is a cross-sectional view schematically illustrating relationship between the sliding member and a belt according to the Embodiment 1.

Figure 5:
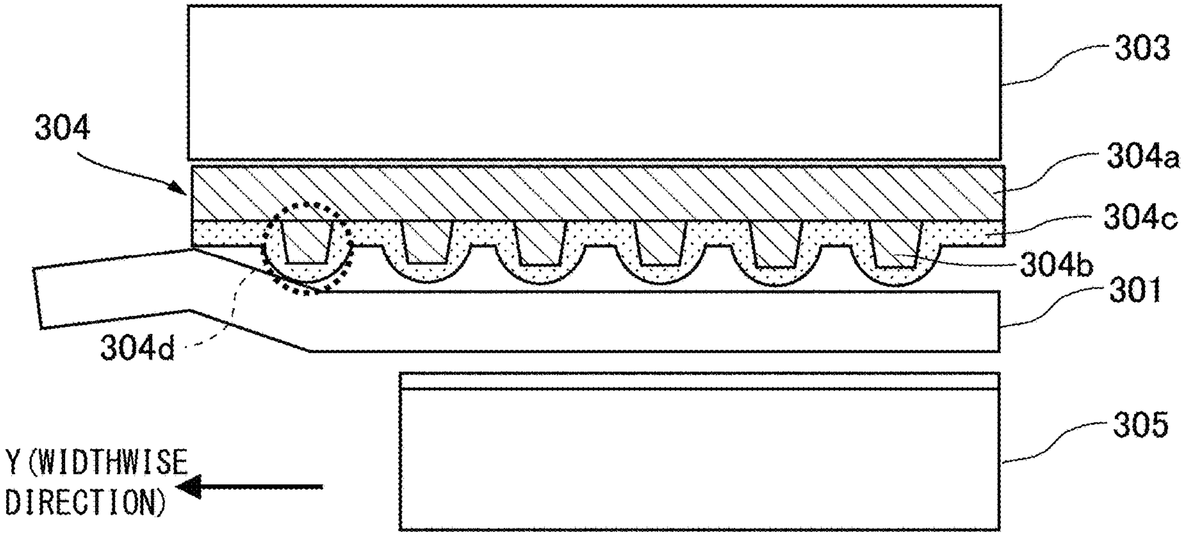

FIG. 5 is a cross-sectional view schematically illustrating relationship between projections at an end portion in a widthwise direction of the sliding member, the belt and a pressing roller according to the Embodiment 1.

Figure 6:
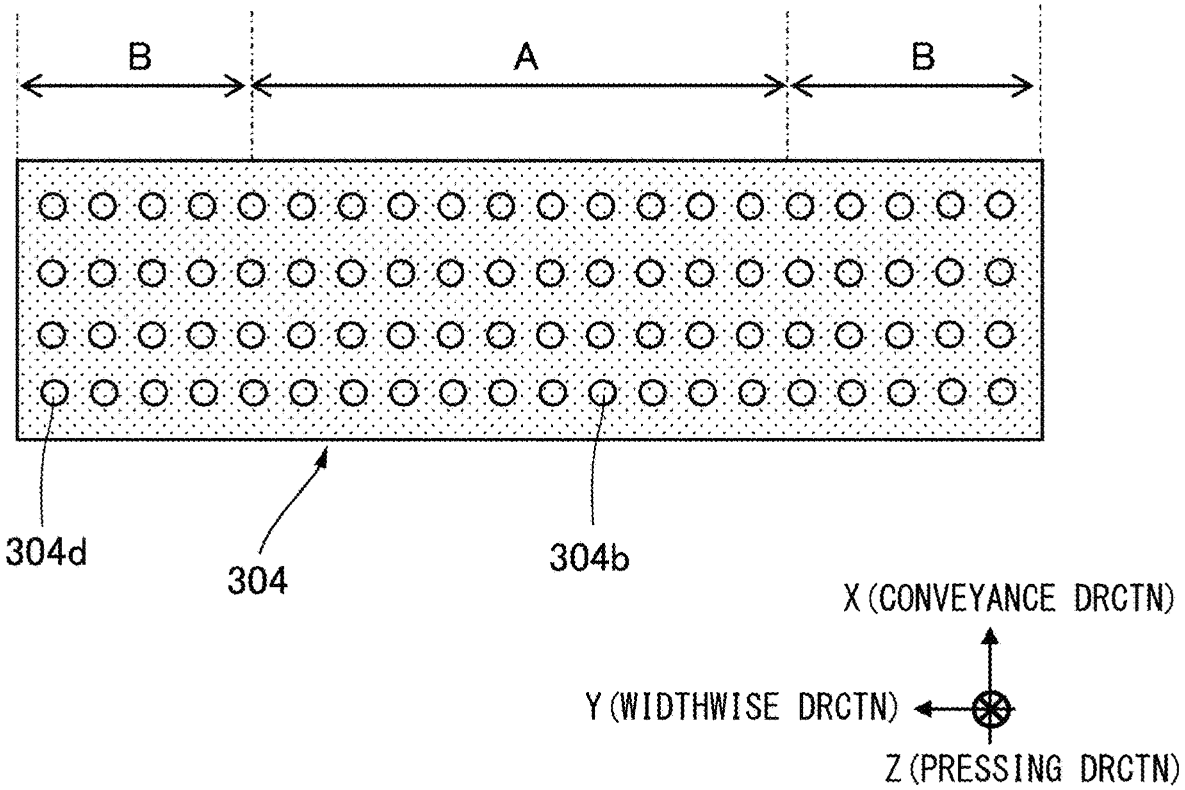

FIG. 6 is a plan view schematically illustrating relationship between an image forming region and a non-image forming region.

Figure 7:
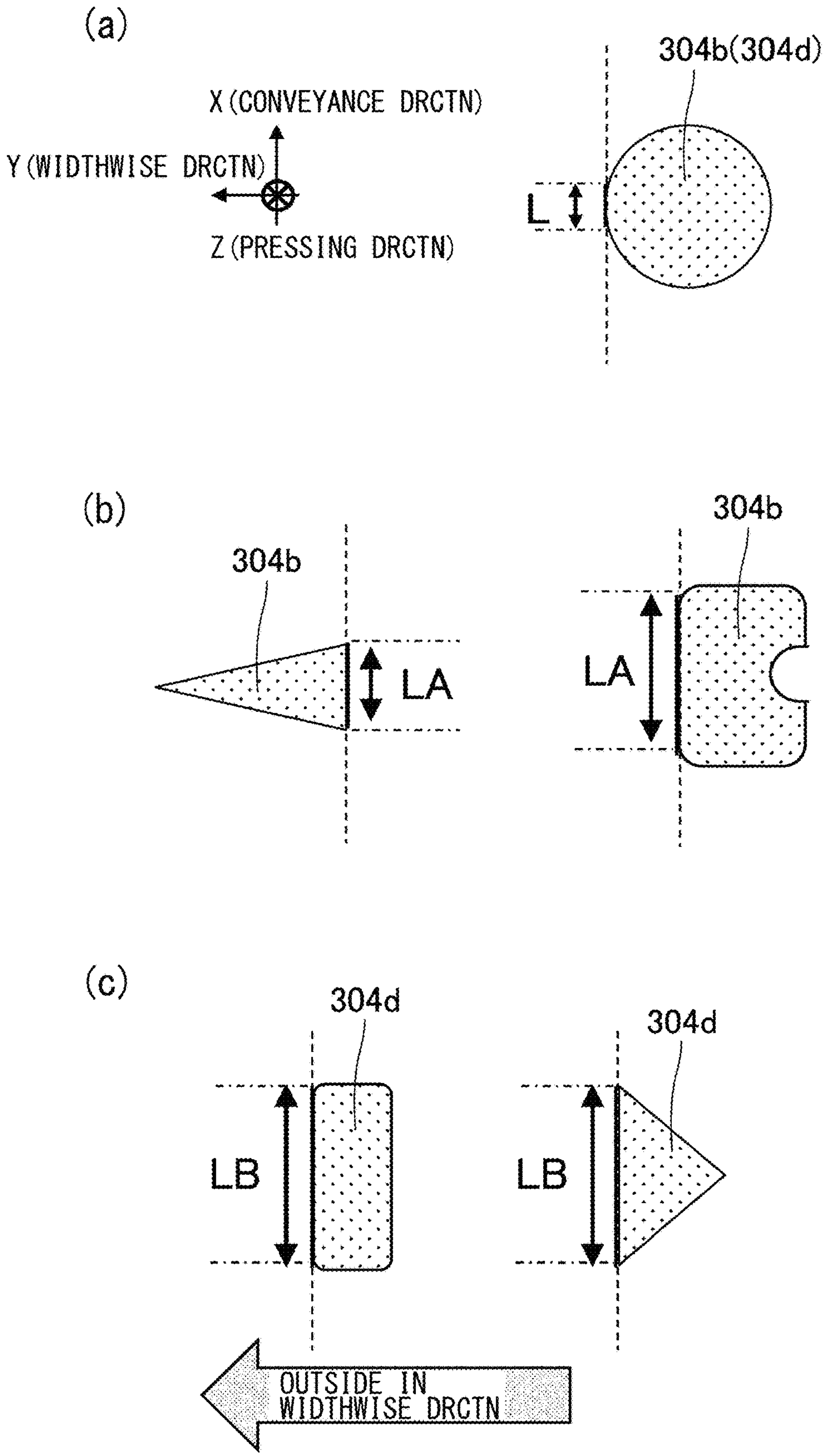

In FIG. 7, of ridge lines of the projection of the sliding member according to the Embodiment 1, part (a) is a schematic view describing a first example, part (b) is a schematic view describing a second example, and part (c) is a schematic view describing a third example.

Figure 8:
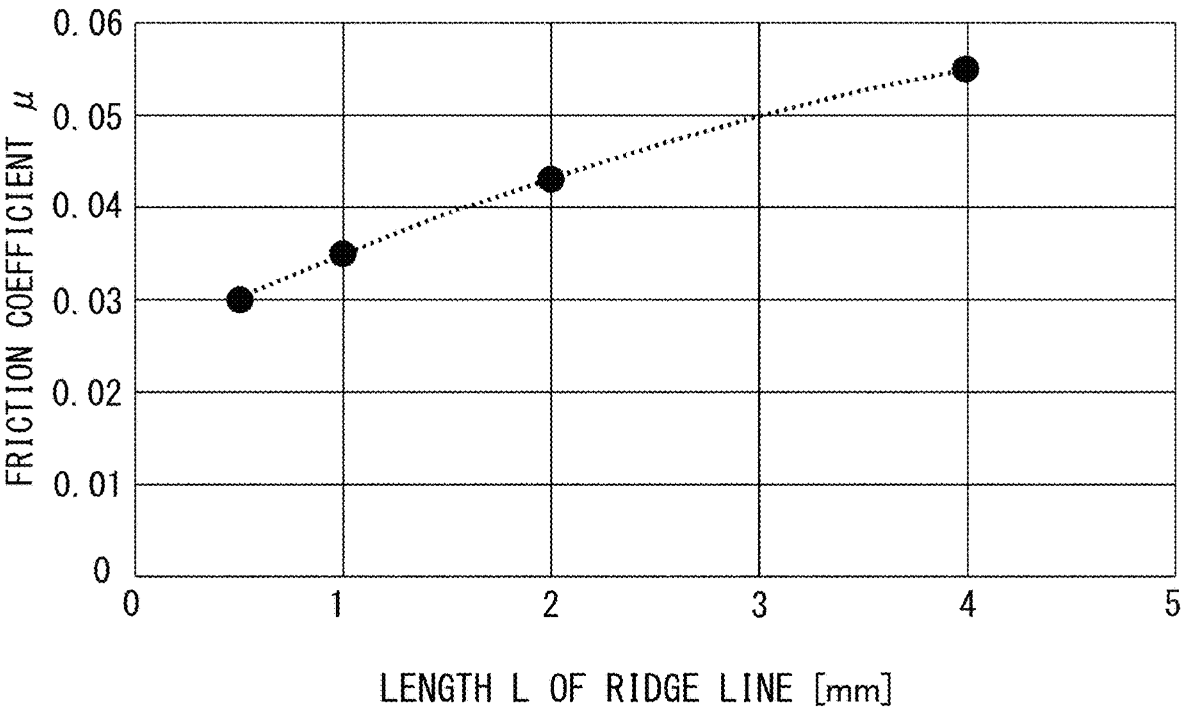

FIG. 8 is a graph showing relationship between the ridge line of the projection and a friction coefficient.

Figure 9:
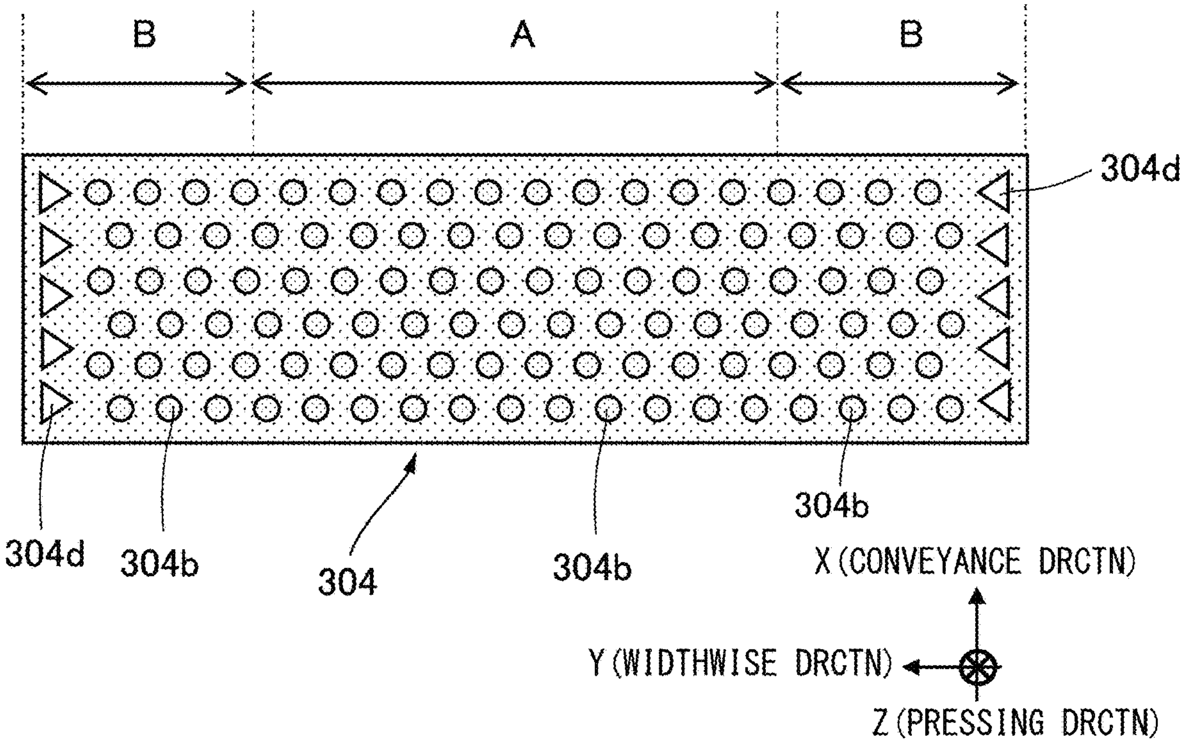

FIG. 9 is a plan view schematically illustrating arrangement of the projections of the sliding member according to the Embodiment 1.

Figure 10:
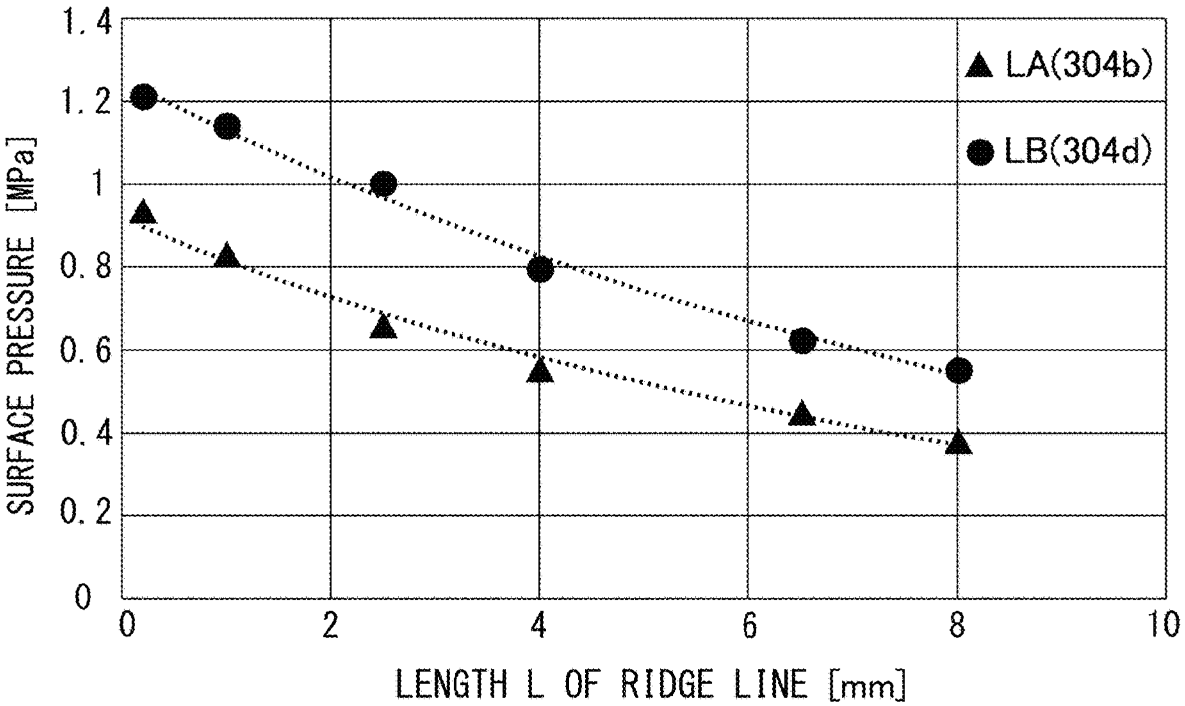

FIG. 10 is a graph showing relationship between a length of the ridge line of the projection and surface pressure applied to a surface of the projection.

Figure 11:
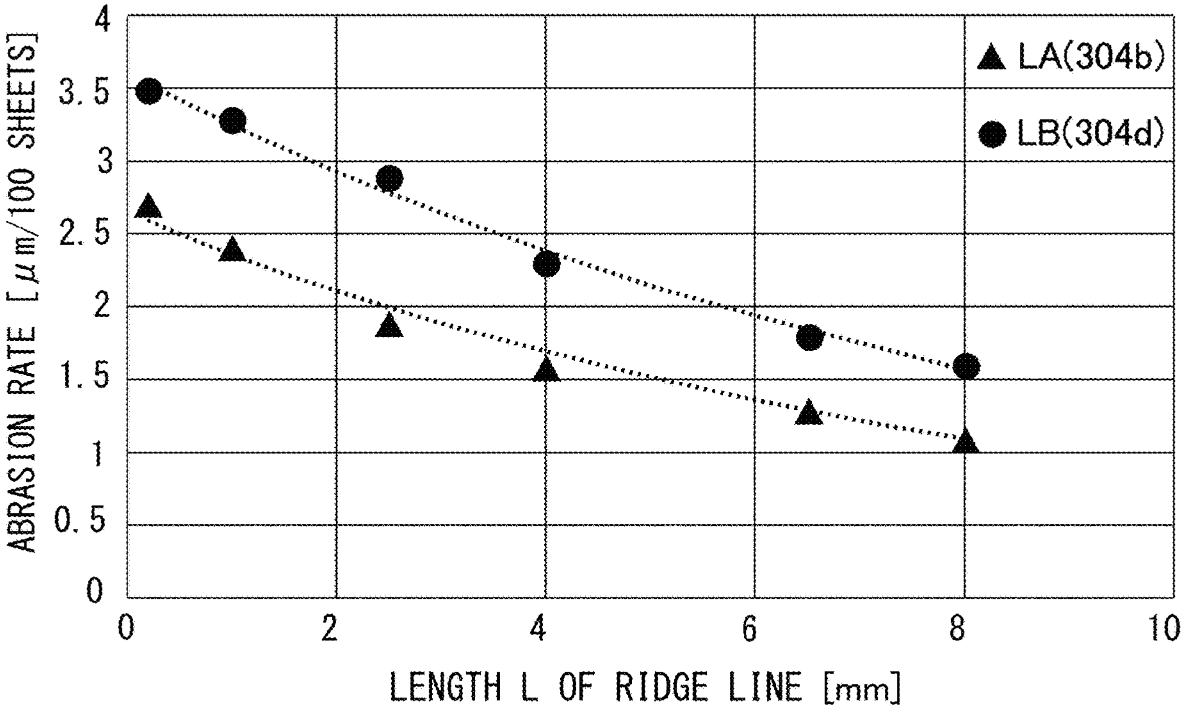

FIG. 11 is a graph showing relationship between the length of the ridge line of the projection and a wearing (abrading) rate.

Figure 12:
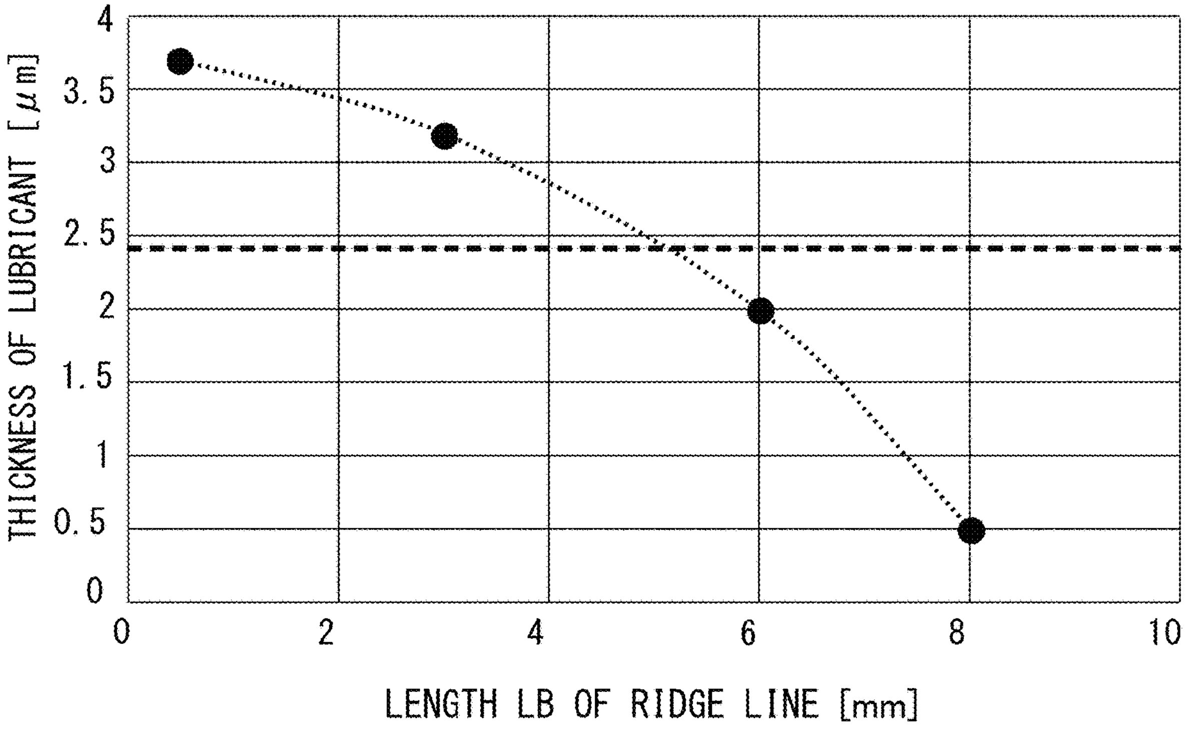

FIG. 12 is a graph showing relationship between a length of the ridge line LB of the projection in the non-image forming region and a thickness of a lubricant.

Figure 13:
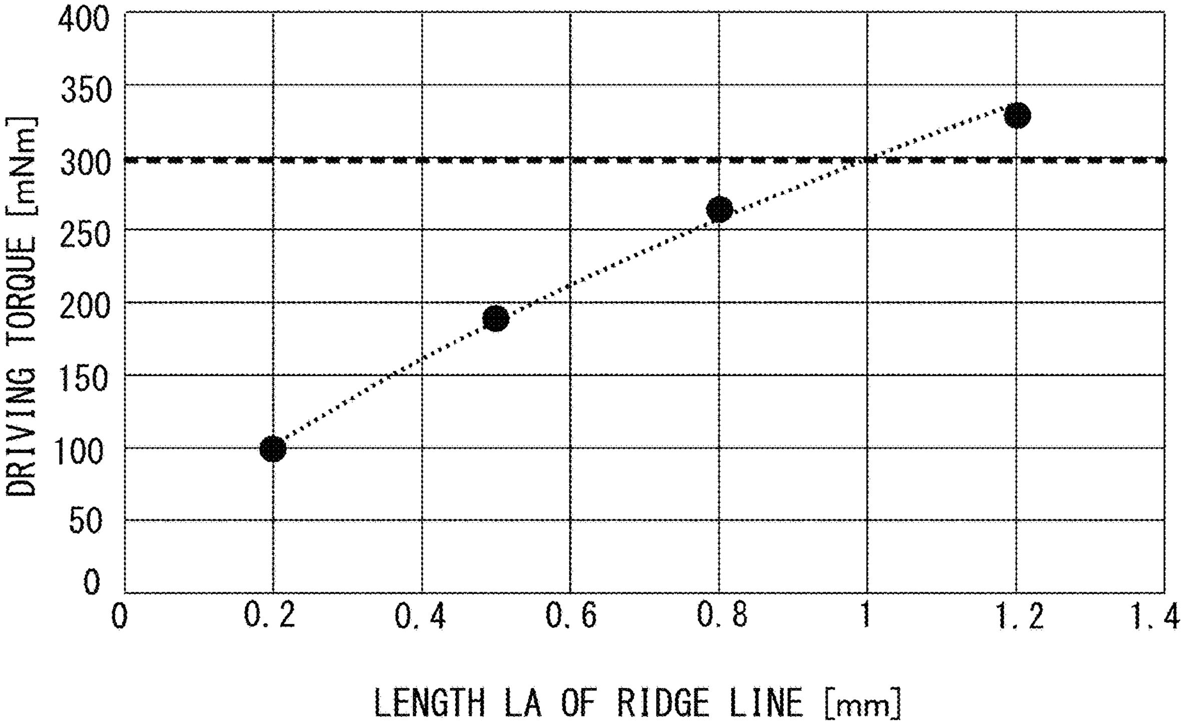

FIG. 13 is a graph showing relationship between a length of the ridge line LA of the projection in the image forming region and driving torque in an Embodiment 2.

Figure 14:
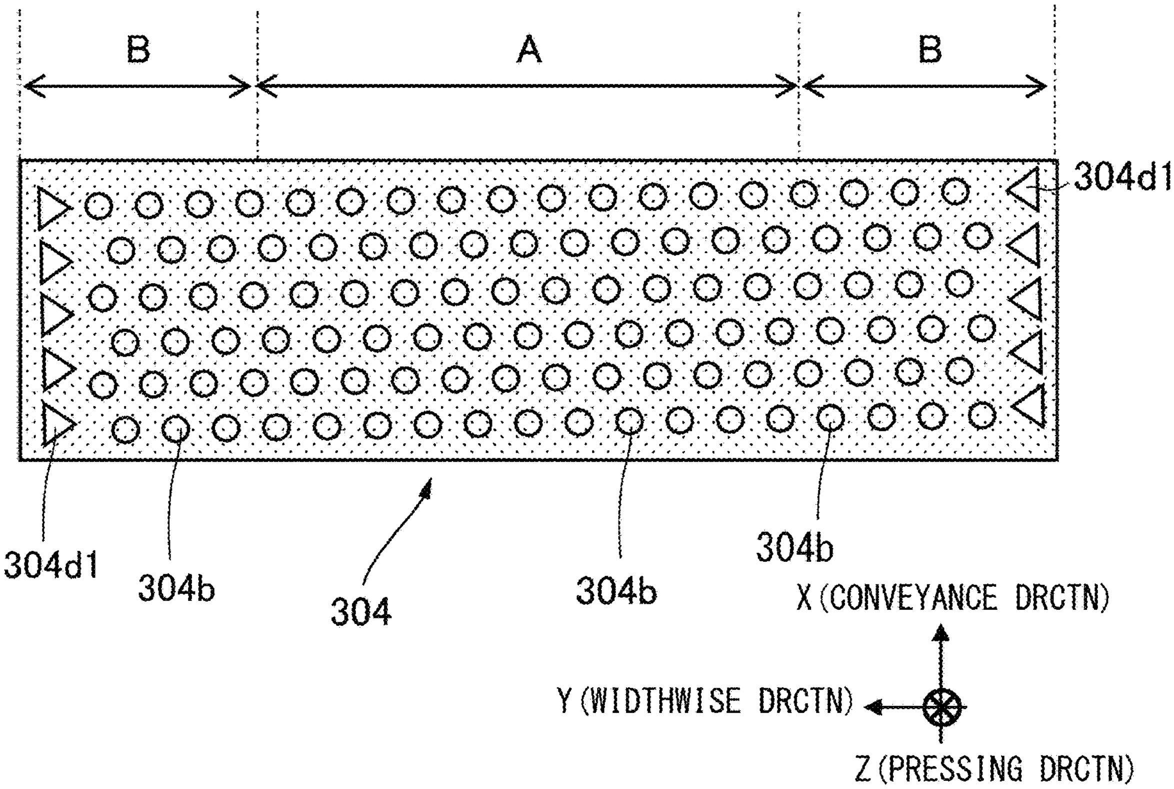
Figure 14:
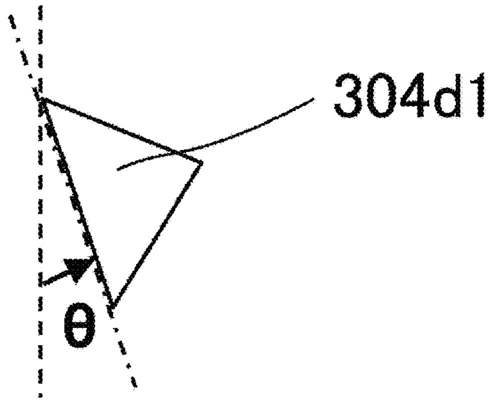

Part (a) of FIG. 14 is a plan view schematically illustrating arrangement of projections of a sliding member according to an Embodiment 3, and part (b) of FIG. 14 is a schematic view illustrating the enlarged projection at an end portion in a widthwise direction of a non-image forming region according to the Embodiment 3.

Figure 15:
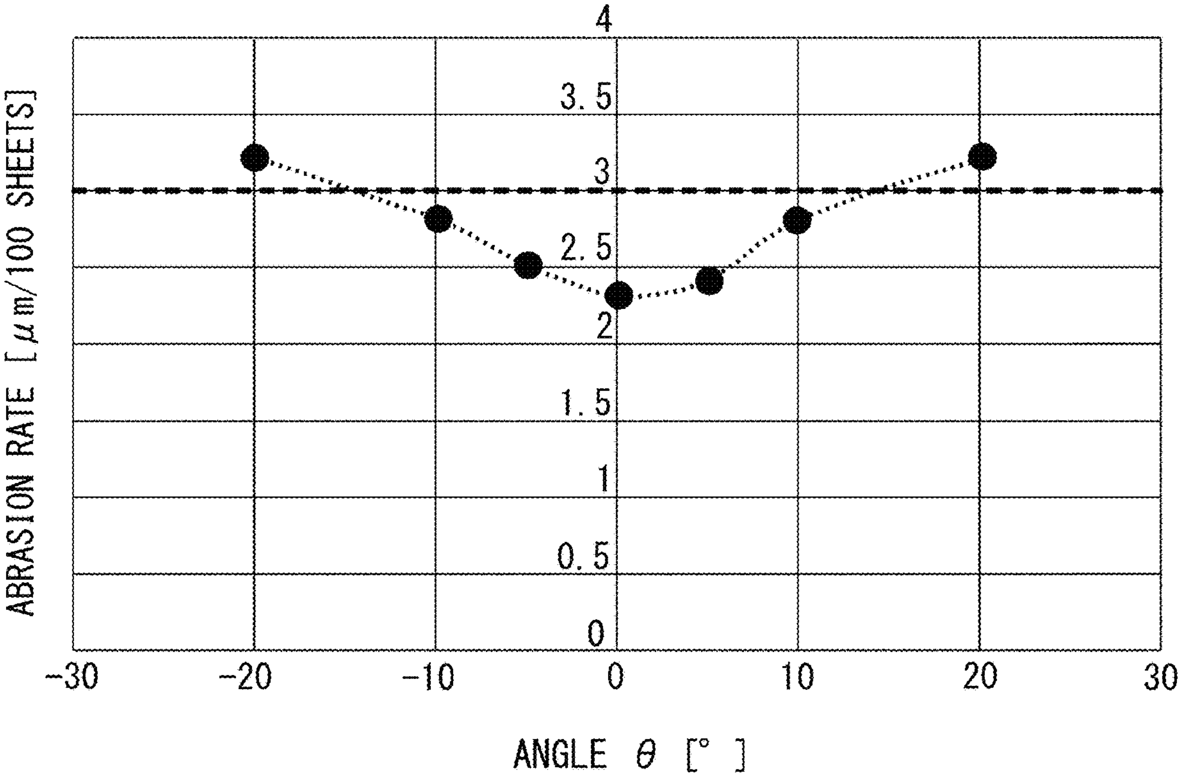

FIG. 15 is a graph showing relationship between an angle of a ridge line of the projection at the end portion in the widthwise direction of the non-image forming region with respect to a conveyance direction and a wearing rate.

Figure 16:
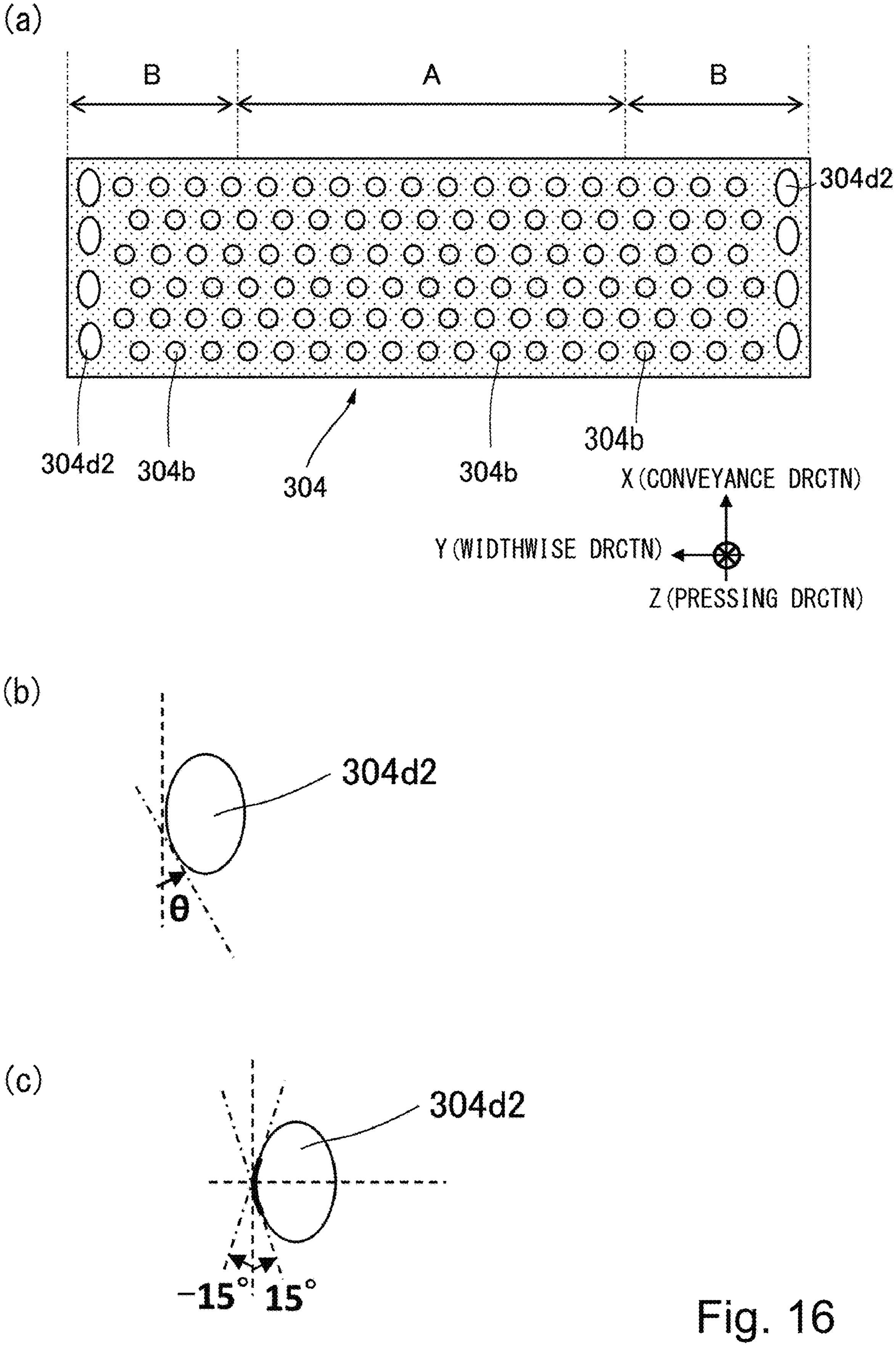

Part (a) of FIG. 16 is a plan view schematically illustrating arrangement of projections of a sliding member according to an Embodiment 4, part (b) of FIG. 16 is a schematic view illustrating the enlarged projection at an end portion in a widthwise direction of a non-image forming region according to the Embodiment 4, and part (c) of FIG. 16 is a schematic view describing a ridge line of the projection at the end portion in the widthwise direction of the non-image forming region.

DESCRIPTION OF THE EMBODIMENTS

Embodiment 1

An Embodiment 1 will be described using FIG. 1 through FIG. 12. First, an overall configuration of an image forming apparatus of the present Embodiment will be described using FIG. 1.

[Image Forming Apparatus]

An image forming apparatus 1 is a full-color printer of electrophotographic type, which is provided with four image forming portions Pa, Pb, Pc and Pd, which are provided correspondingly to four colors of yellow, magenta, cyan and black. In the present Embodiment, it is configured as a tandem type, in which the image forming portions Pa, Pb, Pc and Pd are disposed along a rotational direction of an intermediary transfer belt 204, which will be described below. The image forming apparatus 1 forms a toner image (an image) on a recording material corresponding to an image signal from an image reading portion (document reading apparatus) 2 connected to a main assembly of the image forming apparatus 3 or a host device such as a personal computer communicably connected to the main assembly of the image forming apparatus 3. Examples of the recording material include sheet material such as a paper, a plastic film and cloth.

The image forming apparatus 1 is provided with the image reading portion 2 and the main assembly of the image forming apparatus 3. The image reading portion 2 is what reads a document placed on a document table glass 21, and light emitted from a light source 22 is reflected by the document and an image is formed on a CCD sensor 24 via an optical system member 23 such as a lens. By scanning in a direction of a hollow arrow, such optical system unit converts the document into an electrical signal data sequence of each line. The image signal obtained by the CCD sensor 24 is sent to the main assembly of image forming apparatus 3, and an image processing tailored to each image forming portion is performed in a control portion 30, which will be described below. In addition, the control portion 30 also receives, as an image signal, an external input from an external host device such as a print server.

The main assembly of the image forming apparatus 3 is provided with the plurality of the image forming portions Pa, Pb, Pc and Pd, and in each image forming portion, image formation is performed based on the image signal described above. That is, the image signal is converted into a pulse width modulated (PWM) laser beam by the control portion 30. A polygon scanner 31 as an exposure device scans the laser beam, which corresponds to the image signal. Then, the laser beams are irradiated to photosensitive drums **200*a* through 200*d*** as image bearing members for each of the image forming portions Pa through Pd.

Incidentally, Pa is the image forming portion for yellow color (Y), Pb is the image forming portion for magenta color (M), Pc is the image forming portion for cyan color (C), and Pd is the image forming portion for black color (Bk), and each forms an image of the corresponding color. Since image forming portions Pa through Pd are substantially the same, details of the image forming portion Pa for Y will be described below and the description for the other image forming portions will be omitted. In the image forming portion Pa, the toner image is formed on a surface of a photosensitive drum **200*a*** based on the image signal, as described below.

A charging roller **201*a* as a primary charger charges the surface of the photosensitive drum 200*a* to a predetermined potential and prepares for an electrostatic latent image formation. By the laser beam from the polygon scanner 31, an electrostatic latent image is formed on the surface of the photosensitive drum 200*a*, which is charged to the predetermined potential. A developing unit 202*a* develops the electrostatic latent image on the photosensitive drum 200*a* and forms the toner image. A primary transfer roller 203*a* performs electric discharge from a back surface of the intermediary transfer belt 204 and applies a primary transfer bias having opposite polarity to toner to transfer the toner image, which is on the photosensitive drum 200*a*, to the intermediary transfer belt 204. For the photosensitive drum 200*a* after the transfer, the surface thereof is cleaned by a cleaner 207*a***.

In addition, the toner image on the intermediary transfer belt 204 is conveyed to a next image forming portion, in an order of Y, M, C and Bk, and the toner image of each color formed in each image forming portion is transferred sequentially, and an image of the four colors is formed on the surface thereof. Then, the toner image which has passed through the image forming portion Pd for Bk, which is disposed furthest downstream in the rotational direction of the intermediary transfer belt 204, is conveyed to a secondary transfer portion, which is constituted by a secondary transfer roller pair 205 and 206. Then, in the secondary transfer portion, by a secondary transfer electric field having opposite polarity to the toner image on the intermediary transfer belt 204 being applied, the toner image is secondarily transferred to the recording material.

The recording material is accommodated in a cassette 9, and the recording material fed from the cassette 9 is conveyed to a registration portion 208, which is constituted by a pair of registration rollers, for example, and waits in the registration portion 208. After that, a timing is controlled to align positions the toner image on the intermediary transfer belt 204 and the sheet, and the registration portion 208 conveys the recording material to the secondary transfer portion.

The recording material, to which the toner image has been transferred in the secondary transfer portion, is conveyed to a fixing device 8, and in the fixing device 8, the toner image carried on the recording material is fixed to the recording material by being heated and pressed. The recording material which has passed through the fixing device 8 is discharged onto a discharge tray 7. Incidentally, in a case in which images are formed on both sides of the recording material, when the transfer and fixing of the toner image to a first surface (front surface) of the recording material is completed, the front and a back of the recording material are reversed through a reverse conveyance portion 10, the transfer and fixing of the toner image to a second side (back surface) of the recording material are performed, and the recording material is stacked on the discharge tray 7.

Incidentally, the control portion 30 performs control of the entire image forming apparatus 1 as described above. In addition, the control portion 30 is capable of various types of settings etc. based on an input from an operating portion 4 provided to the image forming apparatus 1. Such control portion 30 includes a CPU (Central Processing Unit), a ROM (Read Only Memory) and a RAM (Random Access Memory). The CPU performs control of each portion while reading programs corresponding to control procedures stored in the ROM. In addition, in the RAM, working data and input data are stored, and the CPU performs control with referring to the data stored in the RAM based on the aforementioned program, etc.

[Fixing Device]

Next, a configuration of the fixing device 8 will be described using part (a) and part (b) of FIG. 2. In the present Embodiment, a fixing device of a belt heating method using an endless belt is employed. In part (a) of FIG. 2, an X direction represents a conveyance direction of a recording material P (not shown in the figure), a Y direction represents a widthwise direction of the recording material crossing (perpendicular to, in the present Embodiment) the conveyance direction of the recording material, and a Z direction represents a pressing direction, which is a direction in which the recording material is pressed in a nip portion N. In the present Embodiment, the X direction, the Y direction and the Z direction are directions perpendicular to each other.

The fixing device 8 includes a fixing belt (hereinafter, "belt") 301, a stay 302, a pressing pad (hereinafter, "pad") 303, a sliding member 304, a pressing roller 305 and a heating roller 307, etc. The belt 301 is a rotatable heating member, which is endless and rotatable. The pressing roller 305 as a nip portion forming member is a rotatable pressing member, which contacts an outer peripheral surface of the belt 301 and forms the nip portion N for nipping and conveying the recording material between itself and the belt 301.

The sliding member 304 as a contact member which contacts an inner peripheral surface of the belt 301 is a member which contacts the inner surface of the belt 301 in the nip portion N. In addition, the inner peripheral surface of the belt and the sliding member 304 are sliding. The pad 303 as a backup member is, inside the belt 301, disposed so as to nip the sliding member 304 and the belt 301 between itself and the pressing roller 305, and backs up the sliding member 304. The sliding member 304 is disposed so as to cover an outer peripheral surface of the pad 303 on the belt 301 side. The stay 302 is, inside the belt 301, disposed on an opposite side of the nip portion N with the pad 303 in between, and supports the pad 303. The heating roller 307 is disposed inside the belt 301 so as to stretch the belt 301 and heat the belt 301. Hereinafter, each configuration will be described in detail.

The belt 301 has thermal conductivity and heat resistance etc. and has a cylindrical shape of thin wall. In the present Embodiment, as shown in part (b) of FIG. 2, the belt 301 is configured to have a three-layer structure, in which a base layer 301*a*, an elastic layer 301*b* on an outer periphery of the base layer 301*a* and a releasing layer 301*c* on an outer periphery of the elastic layer 301*b* are formed. For the base layer 301*a*, for example, a thickness is 80 μm, and for material thereof, polyimide resin (PI) is used. For the elastic layer 301*b*, for example, a thickness is 300 μm and silicone rubber is used. For the releasing layer 301*c*, for example, a thickness is 30 μm and PFA (tetrafluoroethylene perfluoroalkoxyethylene copolymerization resin) as fluororesin is used. The belt 301 is stretched by the pad 303 and the heating roller 307. In addition, an outer diameter of the belt 301 is configured to be 150 mm in the present Embodiment.

The pad 303 is, inside the belt 301, disposed so as to be opposing to the pressing roller 305 across the belt 301, and forms the nip portion N for nipping and conveying the recording material between the belt 301 and the pressing roller 305. In the present Embodiment, the pad 303 is a member, which is long along a widthwise direction of the belt 301 (a longitudinal direction crossing a rotational direction of the belt 301, a rotational axis direction of the heating roller 307) and has a substantially plate shape. By the pad 303 being pressed against the pressing roller 305 across the belt 301, the nip portion Nis formed. For material of the pad 303, LCP (liquid crystal polymer) resin is used. Between the pad 303 and the belt 301, the sliding member 304 is interposed. Details of the sliding member 304 will be described below.

The pad 303 is supported by the stay 302 as a supporting member, which is disposed inside the belt 301. That is, the stay 302 is disposed on an opposite side of the pad 303 to the pressing roller 305 and supports the pad 303. Such stay 302 is a reinforcing member, which is long along the longitudinal direction of belt 301 and has rigidity, and it is in contact with the pad 303 and backs up the pad 303. That is, upon the pad 303 being pressed from the pressing roller 305, the stay 302 provides strength to the pad 303 and secures pressing force in the nip portion N.

The stay 302 is made of metal, such as stainless steel, and a cross section (crossing surface), which is perpendicular to the longitudinal direction of the stay 302 crossing the rotational direction of the belt 301, has a substantially rectangular shape. For example, for the stay 302, a pultruded member of SUS304 (stainless steel) having a wall thickness of 3 mm is used, and by forming the cross section of the stay 302 into a hollow of a substantially rectangular shape, strength thereof is secured. Incidentally, the cross section of the stay 302 may be formed into the substantially rectangular shape by combining a plurality of sheet metals and fixing the sheet metals to each other by welding, etc. In addition, the material of the stay 302 is not limited to the stainless steel as long as the strength thereof can be guaranteed.

The heating roller 307 is disposed inside the belt 301 and stretches the belt 301 together with the pad 303. The heating roller 307 is formed of metal such as aluminum and stainless steel into a cylindrical shape, and inside the heating roller 307, a halogen heater 306 as a heating source for heating the belt 301 is provided. And the heating roller 307 is heated to a predetermined temperature by the halogen heater 306.

The heating roller 307 is also a steering roller which has a rotation center at one end portion in a longitudinal direction thereof or near a center thereof, and by being rotated with respect to the belt 301, a tension difference is generated between front and rear, thereby controlling a position in a main scanning direction of the belt 301. In addition, the heating roller 307 is urged by a spring supported by an unshown frame, and is also a tension roller, which provides a predetermined tensile force to the belt 301.

In the present Embodiment, the heating roller 307 is formed of, for example, a pipe made of stainless steel and having a thickness of 1 mm. In addition, the halogen heater 306 may be one, however, it is preferable to have a plurality of the halogen heaters 306 in view of temperature distribution control in the longitudinal direction (rotational axis direction) of the heating roller 307. The provided plurality of the halogen heaters 306 have lighting distribution, which differs from each other in the longitudinal direction, and a lighting ratio is controlled corresponding to a size of the recording material. In the present Embodiment, three halogen heaters 306 are disposed. Incidentally, the heating source is not limited to the halogen heater, but can also be other heaters, which are capable of heating the heating roller 307, for example, such as a carbon heater. The belt 301 is heated by the heating roller 307 heated by the halogen heater 306 and controlled to a predetermined target temperature corresponding to a type of the recording material based on temperature detection by an unshown thermistor (temperature detecting member).

The pressing roller 305 is also a rotatable driving member, which rotates with contacting the outer peripheral surface of the belt 301 and applies driving force to the belt 301. Incidentally, in the present Embodiment, the heating roller 307 is also rotationally driven by a driving source (for example, a driving motor), and applies driving force to the belt 301. However, the application of the driving force to the heating roller 307 may be omitted. The pressing roller 305 is a roller, in which a core metal (shaft) 305*c*, an elastic layer 305*b* on an outer periphery of the core metal 305*c*, and a releasing layer 305*a* on an outer periphery of the elastic layer 305*b* are formed. For the core metal 305*c*, for example, stainless steel having a diameter of 72 mm is used. For the elastic layer 305*b*, for example, conductive silicone rubber having a thickness of 8 mm is used. For the releasing layer 305*a*, for example, PFA (tetrafluoroethylene perfluoroalkoxyethylene copolymerization resin) as fluororesin having a thickness of 100 μm is used. The pressing roller 305 is rotatably supported by a frame of the fixing device 8 (not shown), and a gear is fixed to one end portion thereof, and the pressing roller 305 is rotationally driven by being connected to a driving source (e.g., a driving motor, not shown) via the gear.

The fixing device 8 heats the toner image in the nip portion N formed between the belt 301 and the pressing roller 305, while nipping and conveying the recording material P carrying the toner image. In this manner, the fixing device 8, while nipping and conveying the recording material P, fixes the toner image to the recording material P. Therefore, it is necessary for the fixing device 8 to work well in both functions of applying heat and pressure and of conveying the recording material P. By an unshown driving source, the pressing roller 305 is pressed against the sliding member 304 via the belt 301. In the present Embodiment, pressing force (NF) in the nip portion N during image formation is 1600 N, and it is configured so that a width in the X direction (conveyance direction of the recording material) of the nip portion Nis 24.5 mm, and a width in the Y direction (widthwise direction of the recording material) thereof is 326 mm.

[Sliding Member]

A detailed configuration of the sliding member 304 is shown in part (a) and part (b) of FIG. 3. Part (a) of FIG. 3 is a cross-sectional view of the sliding member 304 cut in the conveyance direction, and part (b) of FIG. 3 is a plan view of the sliding member 304 as seen from a contact surface side between the belt 301 and the sliding member 304. The sliding member 304 is fixed by a screw, etc. to the stay 302 via the pad 303. Incidentally, the sliding member 304 may be integrated with the pad 303. In addition, a part of the sliding member 304 may be fixed to the stay 302 and/or the pad 303. For example, both end portions in the Y direction (widthwise direction) of the sliding member 304 may be fixed to the pad 303 by screws, etc.

The sliding member 304 is constituted by a base material layer 304*a* and a sliding layer 304*c*. On a side of the base material layer 304*a*, which slides with the belt 301, a plurality of projections 304*b*, which project toward the inner peripheral surface of the belt 301, and projections 304*d* (see FIGS. 5, 9, etc., but omitted in FIGS. 2 through 4), which will be described below, are formed. The sliding layer 304*c* is provided so as to cover a surface on the side of the base material layer 304*a* which slides with the belt 301 (including the plurality of the projections 304*b* and 304*d*). Incidentally, projecting portions formed by the projections 304*b* and 304*d* being covered by the sliding layer 304*c* are referred to as embossed portions 304*e*.

The base material layer 304*a* only has to have sufficient heat resistance and strength. Examples of material include stainless steel, copper, aluminum, engineering plastics (PI (polyimide), PEEK (polyether ether ketone), LCP (liquid crystal polymer), etc.), and in the present Embodiment, metallic material such as stainless steel, copper and aluminum are desirable. In the present Embodiment, as the base material layer 304*a*, stainless steel having a thickness of 1.3 mm is employed.

The plurality of the projections 304*b* and 304*d* are provided from the base material layer 304*a* toward the inner peripheral surface of the belt 301. In addition, the plurality of the projections 304*b* and 304*d* are integrally formed with the base material layer 304*a* with the same material and are arranged across the conveyance direction of the recording material (X direction) in the nip portion N and across the widthwise direction of the recording material crossing the conveyance direction (Y direction), respectively. A distance (interval) d between centers of the adjacent projections 304*b* and 304*d* with respect to the conveyance direction and a distance (interval) d between centers of the adjacent projections 304*b* and 304*d* with respect to the widthwise direction are 1.25 mm or more, and preferably 1.4 mm or more, respectively. In the present Embodiment, in order to make sliding performance with the belt 301 even, the distance between the plurality of the projections 304*b* and 304*d* are configured to be the same in the conveyance direction and in the widthwise direction, and each distance d is configured to be 1.4 mm. In addition, the plurality of the projections 304*b* and 304*d* are distributed on the nip portion N and outside the nip portion N with respect to the widthwise direction.

In this manner, by providing the plurality of the projections 304*b* and 304*d* to the surface (sliding surface) of the sliding member 304 on the side which slides with the belt 301, a contacting area between the sliding member 304 and the belt 301 is reduced and sliding resistance between the sliding member 304 and the belt 301 is reduced. In the projections 304*b* and 304*d*, leading side surfaces thereof are flat and, as described below, except the projections 304*d* at both end portions in the widthwise direction, are formed substantially cylindrical.

It is preferable that the sliding layer 304*c* be formed of a coating agent such as fluororesin (PTFE (polytetrafluoroethylene), PFA, etc.) to realize low friction. In the present Embodiment, the sliding member 304 is formed by coating PTFE having a thickness of 20 μm on the surface of the base material layer 304*a* including the plurality of the projections 304*b*. In addition, in the present Embodiment, lubricant is applied to the inner surface of the belt 301. As a result, the belt 301 has a configuration which slides smoothly with the sliding member 304. As the lubricant, silicone oil is used. Incidentally, in the present Embodiment, it is configured as the sliding layer 304*c* is provided to the base material layer 304*a*, however, it may be a configuration in which an adhesion layer is provided between the base material layer 304*a* and the sliding layer 304*c*. By using the adhesion layer, in a case in which metallic material such as stainless steel, copper and aluminum is used for the base material layer 304*a*, it becomes possible to manifest good adhesive strength between the base material layer 304*a* and the sliding layer 304*c*.

In addition, the sliding member 304 in the present Embodiment is configured to cover the pad 303 regardless of inside and outside the nip portion N. That is, except for a surface of the pad 303 on an opposite side to the nip portion N, an entire surface opposing to the belt 301 is covered by the sliding member 304. In addition, the plurality of the projections 304*b* are disposed in an entire region of the sliding member 304.

[Relationship Between the Base Material Layer and the Sliding Layer of the Sliding Member]

As described above, in the sliding member 304, the surface of the base material layer 304*a* on the side on which the plurality of the projections 304*b* are formed is covered by the sliding layer 304*c*. Here, details of the sliding layer 304*c* of the sliding member 304 upon the fixing device 8 being driven will be described. As shown in FIG. 4, during driving of the fixing device 8, the belt 301 is moved relatively to the sliding member 304 in a direction D in the figure, which causes the sliding layer 304*c* to slide with the base layer 301*a* of the belt 301.

FIG. 5 is a schematic view illustrating relationship between the sliding member 304 and the belt 301 at an end portion thereof in the widthwise direction. Focusing on the projection 304*d* at an end portion on an outmost side with respect to the widthwise direction of the sliding member 304 (also referred to as an endmost portion in the widthwise direction), a step is formed due to a space existing in a contacting portion with the belt 301 outside the projection 304*d* in the widthwise direction, and the belt 301 bends along the step. Therefore, for the projection 304*d* at the endmost portion in the widthwise direction, of both end portions, in the widthwise direction, of the leading side surface of the projection 304*d*, in a state in which the belt 301 strongly contacts an outer side of the end portion (in other words, an outer side of an edge portion), a rotation operation is performed. As a result, the sliding layer 304*c*, which covers the edge portion of the projection 304*d* at the endmost portion in the widthwise direction, and the inner peripheral surface of the belt 301, which slides therewith, become likely to wear (abrade).

When the sliding layer 304*c* wears and worn powder thereof is deposited in a gap between the sliding member 304 and the pad 303, by the worn powder fixedly adhered to the gap damaging the inner surface of the belt 301, breakage in the belt 301 may occur, and furthermore, by an increase in sliding resistance, driving torque may rise, which may lead to shortening of a lifetime of the sliding member 304. Therefore, in order to improve the lifetime of the sliding member 304, it is required to suppress the wear of the sliding layer 304*c* of the projection 304*d* at the endmost portion in the widthwise direction. In addition, when the inner peripheral surface of the belt 301 is likely to wear, a lifetime of the belt 301 gets to be shortened than expected, therefore it is required to suppress the wear of the inner peripheral surface of the belt 301 as well.

[Image Forming Region and Non-Image Forming Region]

FIG. 6 is a schematic view in which shapes and arrangement of the projections of the sliding member 304 are shown. As shown in the figure, the surface of the sliding member 304 on the side which slides with the belt 301 is constituted by a region A, which is an image forming region, and a region B, which is a non-image forming region. Here, the image forming region (region A) is, in the surface of the sliding member 304 on the side which slides with the belt 301, a region through which the recording material of a maximum size, up to which the fixing device 8 can fix, passes. In addition, the non-image forming region (region B) is, in the surface of the sliding member 304 on the side which slides with the belt 301, a region outside the image forming region with respect to the widthwise direction. Incidentally, in FIG. 6, also for the projections 304*d* at the endmost portion in the widthwise direction are shown as substantially cylindrical shapes, as are the other projections 304*b*, however, in the present Embodiment, the projection 304*d* has a shape, for example, shown in FIG. 9. The shape of the projection 304*d* may be, if conditions described below are met, different forms from that of FIG. 9, such as the shape shown in FIG. 6 and shapes shown in part (b) and part (c) of FIG. 7, which will be described below.

As shown in FIG. 9, the projections 304*b* in the region A are circular. On the other hand, the projections 304*d* at the endmost portion in the widthwise direction are polygonal. In a case in which the polygonal projections are provided in the region A, a glossy streak, which appears as a line in a printed product, may be generated. Therefore, in the region A, which is within the image forming region, the circular projections 304*b* are provided. On the other hand, the projections 304*d* at the endmost portion in the widthwise direction are configured to be polygonal. Since the endmost portion in the widthwise direction is not the image forming region, there is no need to consider the glossy streak. Thus, by configuring as the polygonal shape, it becomes possible to suppress the wear of the belt 301. The polygonal shape described here includes a shape, of which corners are chamfered, as illustrated on a left in part (c) of FIG. 7. Incidentally, in the present Embodiment, as the polygonal shape, a triangle or a square is employed.

[Ridge Line of the Projection]

With respect to the shapes of the projections 304*b* and 304*d* of the sliding member 304, as shown in part (a) through part (c) of FIG. 7, upon the belt 301 being rotationally driven, a length in which the belt 301 contacts the edge portions of the projections 304*b* and 304*d* are defined as ridge lines L. In addition, the ridge line L of the projection 304*b* positioned in the region A is denoted as LA, and the ridge line L of the projection 304*d* positioned at the endmost portion in the widthwise direction in the region B is denoted as LB. In this case, in a case in which there is a plurality of the ridge lines L having different lengths in one projection 304*b* (or 304*d*), for example, as exemplified in part (b) and part (c) of FIG. 7, a longest ridge line Lis defined as LA in the projection 304*b*, which is positioned in the region A, and the ridge line L on the outer side in the widthwise direction is defined as LB in the projection 304*d* at the endmost portion in the widthwise direction.

That is, in the image forming region (region A), of both end portions, in the widthwise direction, of the leading side surface of the projection 304*b*, the line of the end portion (hereinafter, also referred to as the edge portion) of which the length is longer in the conveyance direction of the recording material is defined as a first ridge line and a length of the first ridge line is defined as LA. In addition, in the non-image forming region (region B), the line of the end portion (hereinafter, also referred to as the edge portion) of the outer side, in the widthwise direction, of the leading side surface of the projection 304*d*, which is positioned on the outmost side with respect to the widthwise direction is defined as a second ridge line and a length of the second ridge line is defined as LB. In the present Embodiment, the second ridge line is a straight line which is substantially parallel to the conveyance direction of the recording material.

By lengthening the ridge line L, pressure applied to the edge portions of the projections 304*b* and 304*d* is distributed, therefore amounts of wear (abrasion) of the sliding layer 304*c* of the edge portions of the projections 304*b* and 304*d* are reduced. In addition, it becomes possible to suppress the wear of the inner peripheral surface of the belt 301 as well. On the other hand, as shown in FIG. 8, the longer the ridge line L, the larger the contacting area between the projections 304*b* and 304*d* and the belt 301, which increases viscous resistance of the lubricant, which is applied to the inner surface of the belt 301, resulting in a higher friction coefficient μ.

When the rotation operation is continued in a state in which μ is high, the wear of the sliding layer 304*c* is accelerated, and the sliding member 304 may have a short life. Therefore, by shortening the length of the first ridge line LA of the projection 304*b* positioned in the region A, which occupies a wide area in the regions in which the projections 304*b* and 304*d* of the sliding member 304 are disposed, and lengthening the length of the second ridge line LB of the projection 304*d* positioned at the endmost portion in the widthwise direction in the region B, it becomes possible to suppress the wear of the sliding layer 304*c* of the projection 304*d* at the endmost portion in the widthwise direction, and suppress the effect on the rotation operation of the belt 301 by keeping the friction coefficient μ at the projection 304*b* low.

Therefore, in the present Embodiment, when an average length of LA of the plurality of the projections 304*b* in the region A (image forming region) is defined as $LA_{ave}$ and an average length of LB of the plurality of the projections 304*d* in the region B (non-image forming region) is defined as $LB_{ave}$, it is configured to satisfy the following:

$$LB_{ave} > LA_{ave}$$

In this manner, by configuring the average ridge line length $LB_{ave}$ of the projections 304*d* at the end portion in the widthwise direction in the region B longer than the average ridge line length $LA_{ave}$ of the projections 304*b* positioned in the region A, it becomes possible to realize improvement of the lifetime of the sliding member 304.

In this case, the average ridge line length $LB_{ave}$ and $LA_{ave}$ are calculated as following. That is, $LA_{ave}$ is defined as an average length of LA of all the projections 304*b* in the image forming region (region A). In addition, $LB_{ave}$ is defined as an average length of LB of all the projections 304*d* in the non-image forming region (region B). However, of the plurality of the projections 304*b* in the image forming region, $LA_{ave}$ may be a longest length of average lengths of LAs of the plurality of the projections 304*b* in one row, which is along the conveyance direction. In addition, of the plurality of the projections 304*d* in the non-image forming region, $LB_{ave}$ may also be an average length of LBs of the plurality of the projections 304*d*, of which LBs are greater than a median thereof.

In FIG. 9, an example of the sliding member 304 including the shapes of the projections 304*b* and 304*d* which satisfy the above conditions is illustrated. In the example shown in FIG. 9, the plurality of the projections 304*b* in the region A are configured to be substantially cylindrical, of which the shapes of the leading side surfaces are circle, and the projections 304*d* at the endmost portion in the widthwise direction in the region B are configured to be substantially triangular prism, of which the shapes of the leading side surfaces are triangle. In addition, the projection 304*d* at the endmost portion in the widthwise direction in the region B is formed so that one side of the triangle is positioned at the end portion on the outer side in the widthwise direction and is substantially parallel to the conveyance direction. Incidentally, the projections 304*b* other than the projections 304*d* in the region B are formed in the same manner as the projections 304*b* in the region A.

In FIG. 10, transitions of surface pressure applied to the surfaces of the projections 304*b* and 304*d* upon the lengths of the ridge lines LA and LB being varied are shown. The reason why the surface pressure of the projection 304*d*, whose ridge line length is LB, is greater than that of the projection 304*b*, whose ridge line length is LA, is because the projections 304*d* are positioned only at the endmost portion in the widthwise direction, and thus contact pressure with the belt 301 becomes greater relative to the projections 304*b*.

In FIG. 11, transitions of the wearing rate upon the lengths of the ridge lines L being varied are shown. A value of the wearing rate (μm/100K sheets) is calculated, based on the relationship between the length of the ridge line L and the surface pressure in FIG. 10, as an amount of the wear (μm) of the sliding layer 304*c* per number of sheets of the recording material which passes through the nip portion N being 100K sheets (100×1000 sheets).

Within a designed lifetime of the fixing device 8, a threshold value for the wearing rate to retain the sliding layer 304*c* is 3 μm/100K sheets. When this threshold is exceeded, before reaching the number of 1000K sheets (the number of sheets of the recording material which passes through the nip portion Nis 1000×1000), which is the lifetime number of sheets of the fixing device 8, since the sliding layer 304*c* is lost due to the rotation operation of the belt 301, the frictional force may get increased and reach the end of lifetime of the fixing device 8 prematurely. From FIG. 11, in order to suppress the wear of the sliding layer 304*c* and to suppress the shortening of the lifetime of the sliding member 304, it is preferable that the length of the second ridge line LB is configured to be 2 mm or longer (LB≥2 mm).

In addition, in order to ascertain possible adverse effect, which may occur by lengthening LB, lubricated states of the belt 301 and the surface of the projection 304*d* are examined. In the present Embodiment, in order to reduce the sliding resistance on the belt 301 and the surface of the projection 304*d*, the lubricant is applied to the inner surface of the belt 301. As a thickness of the lubricant (oil film) approaches surface roughness of the sliding layer 304*c*, by the belt 301 and the projection 304*d* making solid contact, the friction coefficient increases.

Here, an oil film parameter Λ is a ratio of a minimum oil film thickness $h_{min}$ to synthetic roughness σ, and is expressed by the following equation. $\sigma_1$ and $\sigma_2$ are root mean square roughness of each surface.

$$\Lambda = \frac{h_{min}}{\sigma},\ = \sqrt{\sigma_1^2 + \sigma_2^2} \quad \text{[Equation 1]}$$

When Λ>3, it becomes a fluid lubrication state, in which there is little or no solid contact. In other words, in order to continue the rotation operation of the belt 301 without problems in a state where the fluid lubrication, in which the friction coefficient is low, is maintained, it is necessary to secure the thickness of the lubricant to be three times or more of the surface roughness of the sliding layer 304*c*. Since the surface roughness of the sliding layer 304*c* after passing 1000K sheets of the recording material, which is the lifetime number of sheets of the fixing device 8, through the nip portion N is about 0.8 μm, it is sufficient to secure the thickness of the lubricant of 2.4 μm or more, which is three times of the surface roughness.

To investigate effect on the thickness of the lubricant upon varying the length of the second ridge line LB, a plurality of levels of the sliding members 304, in which LB ranges from 0.5 to 8 mm, are prepared, and the thickness of the lubricant (μm), which flows into the projection 304*d* during the rotation operation of the belt 301, is measured. In FIG. 12, measurement results thereof are shown.

As it is clear from FIG. 12, the greater the LB, the smaller the thickness of the lubricant, and when the LB is greater than 5 mm, the thickness of the lubricant falls below 2.4 μm, which is the threshold value for keeping the friction coefficient low. A reason for this is as follows. That is, the lubricant which flows into the projection 304*d* is scraped off by the leading side of the projection 304*d* and the belt 301 upon the projection 304*d* passing. Since the longer the LB, the longer the contacting portion with respect to the conveyance direction, so an amount of the lubricant which is scraped off is increased, and it becomes more likely for the lubricant on the surface of the projection 304*d* to be depleted. Therefore, when LB is larger than 5 mm, a large amount of the lubricant is scraped off upon the projection 304*d* passing, and it becomes impossible to secure the thickness of the lubricant, which is required to keep the friction coefficient low. For this reason, it is preferable to configure the length of the second ridge line LB to be 5 mm or less (LB≤5 mm).

As described above, it is preferable that the length of the second ridge line LB satisfies: 2 mm≤LB≤5 mm. By satisfying this condition, it becomes possible to be effective in suppressing the wear of the sliding layer 304*c* at the edge portion of the projection 304*d* at the endmost portion in the widthwise direction and to improve the lifetime of the sliding member 304 and the belt 301. As a result, it becomes possible to suppress that the sliding member 304 and the belt 301 reach ends of lives thereof within the lifetime of the fixing device 8, thereby suppressing the shortening of the lifetime of the fixing device 8. In addition, since it becomes possible to suppress that the glossy streak occurs in the image forming region, and suppress the wear of the belt 301 due to rubbing between the projection 304*d* at the endmost portion in the widthwise direction and the inner peripheral surface of the belt 301, it becomes possible to suppress degrading of image quality and suppress the shortening of the lifetime of the belt 301.

Embodiment 2

An Embodiment 2 will be described using FIG. 13. In the Embodiment 1 described above, in order to suppress the wear of the edge portion of the projection 304*d* at the endmost portion in the widthwise direction, the range of LB is specified. In contrast, in the present Embodiment, the length of LA is also specified to further improve the lifetime of the sliding member. Since other configurations and actions are the same as those in the Embodiment 1 described above, the same reference numerals will be attached to the same configurations to omit or simplify the description and illustration, and hereinafter, description will focus on points which differ from those of the Embodiment 1.

To investigate effect on the driving torque of the belt 301 upon varying the length of the first ridge line LA of the projection 304*b* in the region A, a plurality of levels of the sliding members 304, in which LA ranges from 0.2 to 1.2 mm, are prepared, and a driving endurance test is conducted. In this case, the sliding member, in which LB is 4 mm, is used. The sliding members 304 are sequentially replaced in the fixing device 8, and the driving endurance test is conducted. The driving endurance test is conducted in a mode in which a state, where the pressing roller 305, which rotationally drives the belt 301, contacts the belt, and a state to be non-contact are alternately repeated. The designed target time in this mode is set to 240 hours. In a case in which the driving torque exceeds a preset upper limit value within the designed target time, the driving endurance test is terminated, and in a case in which the driving torque does not exceed the upper limit value within the designed target time, the driving endurance test is terminated after the designed target time elapses. Incidentally, the upper limit value (threshold value) for the driving torque described above is set to 300 mNm, in which there may be an occurrence of the image defect due to slippage and an occurrence of breakage of the driving gear. In addition, the test is conducted as viscosity of the lubricant η is set to 1000 $mm^2/s$, and a conveyance speed of the recording material v is set to 435 mm/s.

Results of the driving endurance test described above are shown in FIG. 13. In FIG. 13, transition of the driving torque (mNm) depending on LA is shown. The longer LA, the greater the value of the driving torque, and when LA is greater than 1 mm, the driving torque exceeds 300 mNm, which is the threshold value. In this case, upon checking a state of the sliding member, loss of the sliding layer 304*c* at the leading side of the projection 304*b* is not observed. From this, it is suggested that the contacting area between the projection 304*b* and the belt 301 gets increased as the length of LA gets longer, and by the viscous resistance of the lubricant applied to the belt 301 getting increased, the rise in the driving torque results. When keep using in a state in which the driving torque exceeds the threshold value, the rotation operation may stop and result in a short life. Therefore, in the present Embodiment, it is preferable to configure LA to be 1 mm or less (LA≤1 mm).

In addition, in a case in which LA is 0.1 mm or less, since the leading side of the projection 304*b* is very small and sharp, it is confirmed that the sliding layer 304*c* at the plurality of the projections 304*b* are lost at a manufacturing stage. Therefore, it is determined that there is no need to conduct the endurance test. Therefore, in the present Embodiment, it is preferable to configure LA to be 0.2 mm or more (LA≥0.2 mm).

As described above, it is preferable that the length of the first ridge line LA satisfies: 0.2 mm≤LA≤1 mm. By satisfying this condition, it becomes possible to suppress the rise in the driving torque of the belt 301, and further improvement of the lifetime of the fixing device 8 becomes possible.

Embodiment 3

An Embodiment 3 will be described using part (a) of FIG. 14 through FIG. 15. In the Embodiments 1 and 2 described above, the case, in which the edge portion (second ridge line) of the projection 304*d* at the endmost portion in the widthwise direction in the region B is formed substantially parallel to the conveyance direction of the recording material, is described. In contrast, in the present Embodiment, the edge portion (second ridge line) of a projection 304*d*1 at the endmost portion in the widthwise direction in the region B is inclined with respect to the conveyance direction. Since the other configurations and actions are the same as those of the Embodiment 1 or the Embodiment 2 described above, the same reference numerals will be used for the same configurations and description and illustrations thereof will be omitted, and hereinafter, points which differ from the Embodiment 1 and the Embodiment 2 will be mainly described.

In part (a) of FIG. 14, the same sliding member as shown in FIG. 9 is illustrated, however, in the present Embodiment, for the projections **304*d*1 at the endmost portion in the widthwise direction in the region B, it is configured to have a shape shown in part (b) of FIG. 14. That is, the projection 304*d*1 is configured to be a substantially triangular prism, whose shape of a leading side surface is a triangle. In addition, the projection 304*d*1 is formed so that one side of the triangle is positioned at the end portion on the outer side in the widthwise direction and has an inclination of an angle θ with respect to the conveyance direction. Incidentally, the shape of the projection 304*d*1 is not limited to the triangular shape, but can be a shape having a linear portion, such as the shapes shown in part (b) and part (c) of FIG. 7**, so long as this linear portion is positioned at the end position on the outer side in the widthwise direction.

In such a configuration, verification for effect on suppressing the wear at an edge portion of the projection **304*d*1 at the endmost portion in the widthwise direction is performed. In the verification, a plurality of levels of the sliding members 304, in which θ is changed in a range of −20 to 20°, are prepared, and the driving endurance test described in FIG. 13 in the Embodiment 2 is conducted, and the same verification as in FIG. 11** in the Embodiment 1 is performed. In this case, the sliding member, in which LA is 0.5 mm and LB is 4 mm, is used.

Results of the verification described above are shown in FIG. 15. In FIG. 15, transition of the wearing rate with respect to the angle θ (°) of the edge portion of the projection **304*d*1 is shown. A value of the wearing rate is calculated by measuring the thickness of the sliding layer 304*c*** at a beginning and an end of the driving endurance test, respectively, and converting the difference thereof into the amount of wear, which corresponds to the amount of wear when 100K sheets of the recording material are passed through the nip portion N.

As it is clear from FIG. 15, the wearing rate in a case of θ being −15°≤θ≤15° is below 3 μm/100 K, which is the threshold value to retain the sliding layer **304*c* in the designed lifetime, and upon checking a state of the edge portion of the projection 304*d*1 at the endmost portion in the widthwise direction, the sliding layer 304*c* sufficiently remained. On the other hand, in a case in which θ is smaller than −15° or greater than 15°, the wearing rate exceeds the threshold value of 3 μm/100K, and it is confirmed that the sliding layer 304*c* at the edge portion of the projection 304*d*1 at the endmost portion in the widthwise direction disappears. This may be because the edge portion of the projection 304*d*1, which follows the rotation operation of the belt 301 and has a line contact in the entire second ridge line until θ is changed from 0° to a certain value, no longer follows the rotation operation of the belt 301 as θ gets increased. That is, it is suggested that, as θ gets increased, the edge portion of the projection 304*d*1 comes to have a partial point contact with the belt 301, resulting in receiving greater pressure locally, and the wear of the sliding layer 304*c*** is accelerated.

As described above, when the angle θ of the second ridge line with respect to the conveyance direction is in the range of −15°≤θ≤15°, regardless of the disposition of the projection **304*d*1 at the endmost portion in the widthwise direction, it is effective in suppressing the wear of the sliding layer 304*c* at the edge portion of the projection 304*d*1, and it becomes possible to improve the lifetime of the sliding member. In addition, as in the Embodiment 1, it becomes possible to suppress the wear of the belt 301** as well.

Embodiment 4

An Embodiment 4 will be described using part (a) through part (c) of FIG. 16. In each Embodiment described above, the cases, in which the edge portions (second ridge lines) of the projections **304*d* and 304*d*1 at the endmost portion in the widthwise direction in the region B are the straight lines, are described. In contrast, in the present Embodiment, an edge portion (second ridge line) of a projection 304*d*2** at the endmost portion in the widthwise direction in the region B is configured to be a curve. Since the other configurations and actions are the same as those of the Embodiment 1 or the Embodiment 2 described above, the same reference numerals will be used for the same configurations and description and illustrations thereof will be omitted, and hereinafter, points which differ from the Embodiment 1 and the Embodiment 2 will be mainly described.

In the present Embodiment, for the projection **304*d*2 at the endmost portion in the widthwise direction in the region B, for example, as shown in part (a) through part (c) of FIG. 16, the second ridge line thereof (a portion shown by a bold line) is configured to be a curve. In the example in the figure, a case, in which a shape of a leading side surface of the projection 304*d*2** has an oval shape, is illustrated, however, it may be other shapes with a curve, such as a fan shape.

Under such a configuration, verification for effect on suppressing the wear at an edge portion of the projection **304*d*2 at the endmost portion in the widthwise direction is performed. In the verification, a plurality of levels of the sliding members 304 in which θ is changed in a range of −20 to 20° are prepared, and the driving endurance test described in FIG. 13 in the Embodiment 2 is conducted, and the same verification as in FIG. 11 in the Embodiment 1 is performed. Incidentally, in the case in which the edge portion of the projection 304*d*2 is a curve, as shown in part (b) of FIG. 16**, in the second ridge line, an angle, with which a tangent line is inclined with respect to the conveyance direction, is defined as θ.

As a result of the verification, as shown in part (c) of FIG. 16, when θ is within a range of −15°≤θ≤15°, it is confirmed that the sliding layer **304*c* at the edge portion of the projection 304*d*2 at the endmost portion in the widthwise direction remains after the endurance test and the value of the wearing rate is also within the threshold range. This may be because, as in the Embodiment 3, until θ reaches a certain value, the edge portions of the projections 304*d*2 follow the operation of the belt 301** during the rotation operation, and by the edge portions having the line contact, the pressure is dispersed.

As described above, when θ is within the range of −15°≤θ≤15°, even if the edge portion of the projection **304*d*2 is a curve, as in the cases in which the edge portions (second ridge lines) of the projections 304*d* and 304*d*1, which are described in each Embodiment described above, are straight lines, the edge portion of the projection 304*d*2 at the endmost portion in the widthwise direction in the region B can be regarded as the second ridge line. In other words, even if the second ridge line is a curve, in the case in which the line is similar to a straight line, by configuring the angle θ within the range of −15°≤θ≤15°, it becomes possible to obtain the effect of suppressing the wear of the sliding layer 304***c* at the edge portion of the projection 304*d*2 at the endmost portion in the widthwise direction. In addition, as in the Embodiment 1, it becomes possible to suppress the wear of the belt 301 as well. Incidentally, also in a case in which the first ridge line is a curve, at the edge portion of the projection 304*d*, a line, whose angle θ in which a tangent line is inclined with respect to the conveyance direction is within the range of −15°≤θ≤15°, can be regarded as the first ridge line.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-030720 filed on Feb. 29, 2024, which is hereby incorporated by reference herein in its entirety.

What is claimed is:

1. A fixing device for fixing a toner image carried on a recording material to the recording material, the fixing device comprising:

an endless and rotatable belt;

a rotatable pressing member configured to contact an outer peripheral surface of the belt and form a nip portion for nipping and conveying the recording material between itself and the belt; and a contact member configured to contact an inner peripheral surface of the belt in the nip portion, wherein the inner peripheral surface of the belt slides with the contact member, wherein the contact member includes a plurality of projections provided on a side where the contact member slides with the belt and so as to project toward the inner peripheral surface of the belt, the plurality of the projections being distributed on the nip portion and outside the nip portion with respect to a widthwise direction of the recording material crossing a conveyance direction of the recording material, and wherein when in a region where the plurality of the projections of the contact member exist, a predetermined region outside the nip portion in the widthwise direction crossing the conveyance direction of the recording material is defined as a first region, and a region inside the first region in the widthwise direction and inside the nip portion is defined as a second region, of both end portions, in the widthwise direction, of a leading side surface of the projections in the second region, a line of the end portion of which a length is longer in the conveyance direction is defined as a first ridge line and the length of the first ridge line is defined as LA, a line of the end portion outside, in the widthwise direction, the leading side surface of the projection which is positioned on the outmost side with respect to the widthwise direction in the first region is defined as a second ridge line and the length of the second ridge line is defined as LB, of the plurality of the projections in the second region, an average length of the LA of the plurality of the projections in a line along the conveyance direction is defined as $LA_{ave}$, and of the plurality of the projections in the first region, an average length of the LB of the plurality of the projections in a line along the conveyance direction is defined as $LB_{ave}$, the following relationship is satisfied:

$$LB_{ave} > LA_{ave}.$$

2. The fixing device according to claim 1, wherein the following relationship is satisfied:

$$LB \geq 2 \text{ mm}.$$

3. The fixing device according to claim 1, wherein the following relationship is satisfied:

$$LB \leq 5 \text{ mm}.$$

4. The fixing device according to claim 1, wherein the following relationship is satisfied:

$$LA \geq 0.2 \text{ mm}.$$

5. The fixing device according to claim 1, wherein the following relationship is satisfied:

$$LA \leq 1 \text{ mm}.$$

6. The fixing device according to claim 1, wherein the second ridge line is substantially parallel to the conveyance direction.

7. The fixing device according to claim 1, wherein the second ridge line is a line inclined to the conveyance direction.

8. The fixing device according to claim 7, wherein when an angle of the second ridge line to the conveyance direction is θ, the following relationship is satisfied:

$$-15° \leq \theta \leq 15°.$$

9. The fixing device according to claim 7, wherein the contact member includes a sliding layer configured to cover a surface including the plurality of the projections and on a side where the contact member slides with the belt.

10. The fixing device according to claim 1, wherein the second ridge line is a curve, and when an inclined angle of a tangent line in the second ridge line to the conveyance direction is θ, the following relationship is satisfied:

$$-15° \leq \theta \leq 15°.$$

11. The fixing device according to claim 1, wherein the contact member includes a base material layer formed of a metal.

12. The fixing device according to claim 11, wherein the plurality of the projections are provided toward the inner peripheral surface of the belt from the base material layer and are integrally formed with the base material layer.

13. The fixing device according to claim 1, wherein the pressing member is a pressing roller configured to press the belt toward the contact member.

14. The fixing device according to claim 1, further comprising a heating roller in contact with the inner peripheral surface of the belt, and a heat source configured to heat the heating roller.

15. The fixing device according to claim 1, wherein the leading side surface of the projection which is positioned on the outmost side with respect to the widthwise direction is a polygon.

16. The fixing device according to claim 15, wherein the leading side surface of the projections in the second region is a circle.

* * * * *